April 1, 1947.  R. M. McDADE  2,418,310
PRECOOLING MILKING CONTAINER
Filed Feb. 23, 1945   2 Sheets-Sheet 1
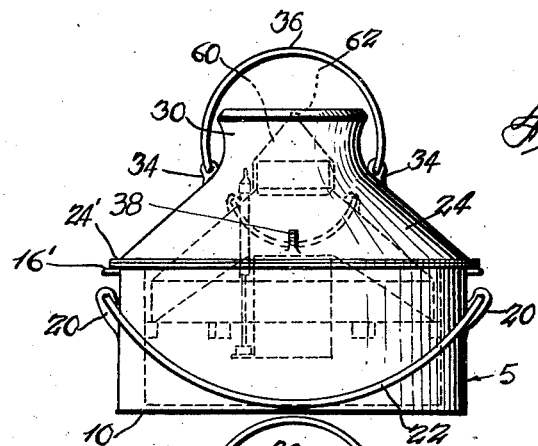
Fig. 1.
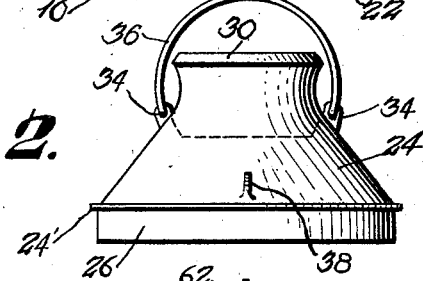
Fig. 2.
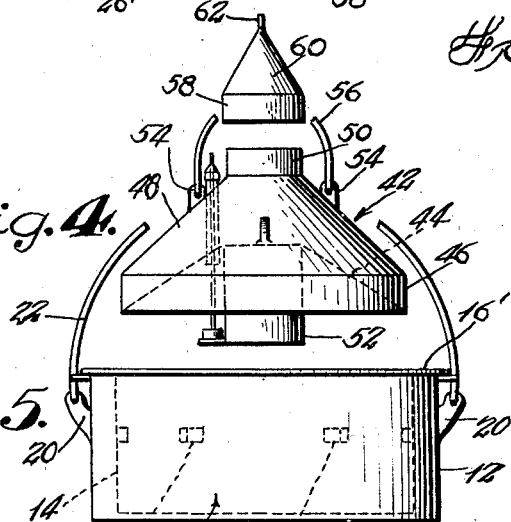
Fig. 3.
Fig. 4.
Fig. 5.
Inventor
Ralph M. McDade
Attorneys

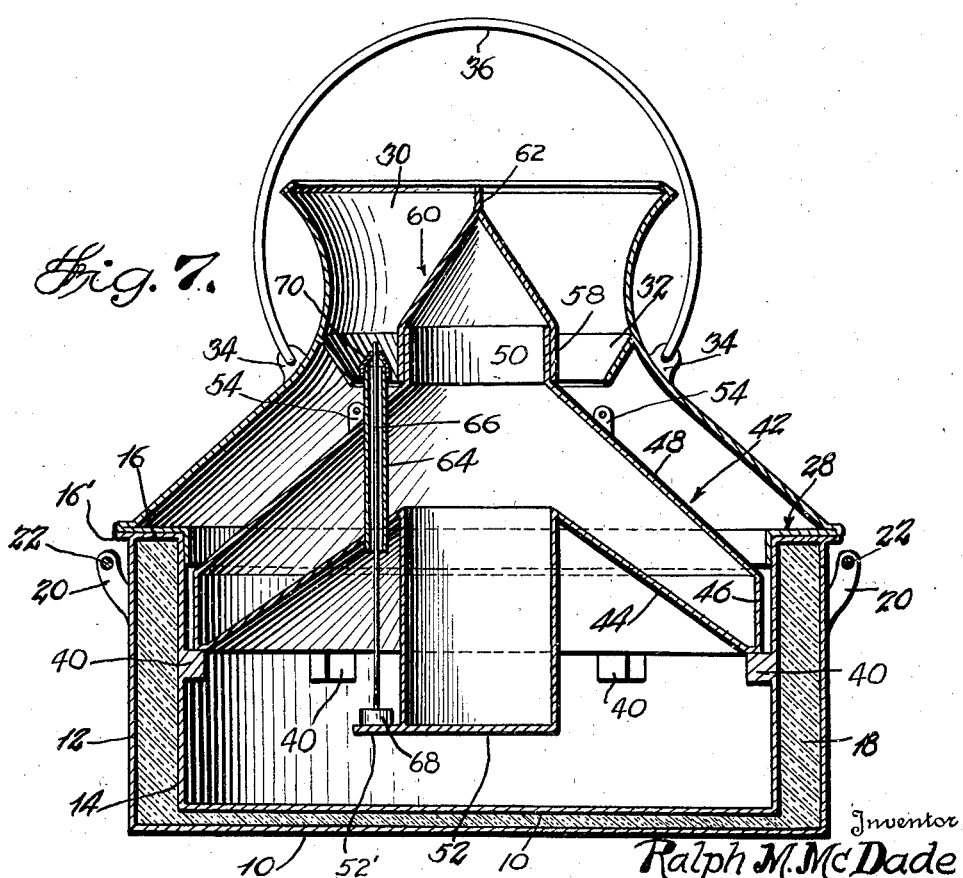

Patented Apr. 1, 1947

2,418,310

UNITED STATES PATENT OFFICE 2,418,310

PRECOOLING MILKING CONTAINER

Ralph M. McDade, Mebane, N. C.

Application February 23, 1945, Serial No. 579,404

8 Claims. (Cl. 31—4)

This invention appertains to improvements in liquid containers generally, and more particularly to a precooling container for use in milking procedure on dairy farms and the like.

The primary object of the invention is to provide a milking container of this kind, to replace the ordinary bucket or pail, usually employed in hand milking operations, so that the warm milk is quickly chilled, immediately upon its being withdrawn from a cow's udder at the teats, from which it is discharged directly into the container and into flowing contact downwardly over the cold surface of a refrigerant holder, housed within the container.

Another object of the invention has to do with the provision of a milking container as above characterized, wherein the parts thereof are constructed in a manner to allow for easy removal and separation of the same, one from the other, for cleaning purposes and, when in assembly, provides for an effective preservation of the milk, until it is used or otherwise disposed of.

With these and other objects and advantages of equal importance in view, the invention resides in the certain new and useful combination, construction, and arrangement of parts, as will be hereinafter more fully described, set forth in the appended claims, and illustrated in the accompanying drawings, in which;

Figure 1 is a side elevation of the improved precooling milking container, in accordance with the invention;

Figure 2 is a similar view, showing the removable top structure per se;

Figure 3 is another similar view, showing the removable closure for the refrigerant holder;

Figure 4 is yet another similar view, showing the removable refrigerant holder per se;

Figure 5 is still another similar view, showing the base structure per se;

Figure 6 is a top plan view, showing the milking container in complete assembly; and Figure 7 is an enlarged, vertical section, taken through the line 7—7 on Figure 6.

Referring in detail to the drawings, wherein like characters of reference denote corresponding parts in the several views, and more particularly to Figures 2 and 5, the container proper is comprised in a base receptacle 5, cylindrical in form, having spaced bottom walls 10, of sheet metal, and spaced, concentrically arranged, outer and inner side walls 12 and 14, interconnected at their lower ends by the bottom walls 10 and, at their upper ends, by a connecting wall 16, to form a dead air space between the same, which space is preferably packed with an insulating material 18. Mounted exteriorly of the outer side wall 12, at points diametrically opposite thereon, is one of a pair of apertured ears 20, to receive the ends of a bail type of handle 22.

Removably supported on the base receptacle 5, is a substantially conical top structure 24, having an annular flange 26, depending from its lower end, for snug fitting engagement in the upper open end of the base receptacle, and a second annular flange 28, extending laterally outward from the upper end of the vertical flange 26, to seat flatly on the connecting wall 16 and an annular lip 16", extending laterally outward from the connecting wall. The upper end of the top structure 24 merges into an upwardly and outwardly flared neck portion 30, which has an angularly disposed annular flange 32, secured interiorly of its lower end to direct inflow of liquid, i. e., milk, through the neck, toward the center of the top structure. Mounted exteriorly of the lower end of the neck portion 30, is a pair of oppositely disposed apertured ears 34, to receive the ends of a second bail type of handle 36, while a bail support 38 is mounted exteriorly of the lower end of the top structure 24, at a point of a line extending on a line substantially midway between the ears 34 and slightly above the extended edge portion 28, of the top structure, to have the bail 36 to rest thereon when it is not in use.

A cooling unit is to be housed within the base receptacle 5 and the top structure 24 and, to such end, it is supported on a plurality of spaced lugs 40, secured interiorly of the base receptacle, on the inner side of the inner side wall 14 thereof. The cooling unit is preferably comprised in a hollow, substantially conical, body 42, having a bottom wall 44, which is upwardly dished in a manner to generally conform to the conical shape of a top wall 48, the lower edge of which is connected with the like edge of the bottom wall 44, by a vertical wall 46. The bottom wall 44 is formed with an opening in its center, for the securement of the upper open end of a cylindrical refrigerant holder 52 therein; the latter depending from its point of securement to a point somewhat below the lower end of the body 42. The top wall 48 is likewise formed with an open center, in line with the open center of the bottom wall 44 and the open top of the refrigerant holder 52, and has an annular flange 50 rising from about the opening, for snug fitting engagement within a like flange 58, formed about the lower open end of a cone-shaped closure or cover 60, which has its apex provided with an upstanding projection 62, the upper end of which terminates substantially in the plane of the top edge of the flared neck 30, of the top structure 24, when the cooling unit and the container structure are in assembly. Mounted exteriorly of the top wall 48, is a pair of diametrically opposed apertured ears 54, to receive the ends of another bail type of handle 56, by means of which the cooling unit can be conveniently lifted for removal and replacement.

Extending vertically through aligned openings formed in the bottom and top walls 44, 48, of the cooling unit, is a gauge tube 64, which is disposed in line with a lateral offset 52' from the bottom end of the refrigerant holder 52, and has its upper end extending above the top wall 48, sufficiently to project upwardly through an opening formed in the angular flange 32, within the neck portion 30, when the top structure 24 is put in place on the base receptacle 10. Depending through the gauge tube 64, is a gauge rod 66, which has its lower end provided with a float member 68, normally resting upon the offset 52', and its upper end projecting from the like end of the gauge tube, so that access may be readily had to it, through the opening of the neck portion 30.

In use, the container, as thus constructed, a suitable refrigerant, such as cracked ice, dry ice or the like, will be placed within the holder 52 and, if desired, it may, partially at least, fill the interior of the cooler body 42. When charged with the refrigerant, the cover 60 is put in place on the neck flange 50 and, after the top structure 24 has been lifted by its handle 36 from the base receptacle 10, the cooling unit is lowered by its handle 56 into the latter, where it will be supported upon the lugs 40, in a uniformly spaced relation with respect to the opposed walls of the base receptacle and the top structure. Following this, the top structure 24 will be replaced on the base receptacle 5, when the container will be ready to be put to use, somewhat after the manner of the ordinary milk bucket or pail. In milking a cow, the streams of milk from the teats will be directed inwardly of the flared opening in the neck portion 30 and against the conical cover 60, which directs the milk flow downwardly through the throat, formed between the cover 56 and the angular flange 32, and onto the sloping top wall 48, of the cooling unit, now being chilled by the refrigerant. From the top wall of the cooling unit, the milk flows downwardly and about the vertical side wall 46 and into the base receptacle 5. As the milk accumulates within the base receptacle, it rises therein and comes into contact with the holder 52, by which it is subjected to the chilling action of the refrigerant, until it is emptied from the base receptacle, upon the removal of the top structure 24 and the cooling unit 42, the rise of the milk within the base receptacle being shown by the altitude assumed by the gauge rod 66, during the milking operation.

Having thus fully described my invention, it is to be understood that various changes in design and minor details of construction and arrangement of the parts of the disclosed embodiment may be resorted to, within the limits defined by the scope of the appended claims.

What I claim is:

1. A precooling milking container, comprising a base milk receiving receptacle, a removable top structure for said base receptacle having an upper outwardly flared neck portion formed centrally of said top structure, a closed refrigerant holder positioned within said base receptacle and extending into said top structure, said refrigerant holder being uniformly spaced from the opposed walls of said base receptacle and said top portion, and independent handles for said base receptacle, said top structure, and said refrigerant holder.

2. The invention as in claim 1, with said base receptacle of cylindrical form and having a flat bottom wall and inner and outer side walls spaced apart to form a closed dead air space between the same, and said top structure having a lower frusto-conical portion and an upper outwardly flared annular neck portion.

3. The invention as in claim 1, with lugs carried on the inner side wall of said base receptacle to support said refrigerant holder in substantially spaced relation with its bottom wall, and said refrigerant holder including a centrally disposed portion depending into the space between the inner side wall and said bottom wall.

4. A precooling milking container, comprising a base milk receiving receptacle of cylindrical form, a removable top structure for said base receptacle having a lower frusto-conical portion and an upper outwardly flared annular neck portion, a refrigerant holder having a lower cylindrical portion supported within said base receptacle and an upper substantially conical portion extending into said top portion, said refrigerant holder being open at its top, a removable closure for the open top of said refrigerant holder, said refrigerant holder being uniformly spaced from the opposed walls of said base receptacle and said top portion, and independent handles for said base receptacle, said top structure, and said refrigerant holder.

5. The invention as in claim 4, with said base receptacle having a flat bottom wall and inner and outer side walls spaced apart to form a dead air space between the same, and an insulating material filling said dead air space.

6. The invention as in claim 4, with said base receptacle having a flat bottom wall and said refrigerant holder having an upwardly dished bottom wall, and a portion of said refrigerant holder depending from the center of its bottom wall into the space between the latter and the bottom wall of said base receptacle.

7. The invention as in claim 4, with said closure for the open top of said refrigerant holder of conical form and extending into the neck portion of said top portion of the base receptacle.

8. The invention as in claim 4, with a tubular element extending vertically through the top and bottom walls of said refrigerant holder, and a gauge rod extending through said tubular element, with a float member on its lower end and its upper end projecting into the neck portion of the top portion of said base receptacle.

RALPH M. McDADE.

REFERENCES CITED

The following references are of record in the file of this patent:

UNITED STATES PATENTS

| Number | Name | Date |
|---|---|---|
| 202,239 | Moore | May 28, 1878 |
| 1,346,937 | Butman et al. | July 20, 1920 |